United States Patent
Crawford, Jr. et al.

(10) Patent No.: US 6,456,996 B1
(45) Date of Patent: Sep. 24, 2002

(54) COMPUTER IMPLEMENTED SCHEDULING SYSTEM AND PROCESS USING ABSTRACT LOCAL SEARCH TECHNIQUE

(75) Inventors: James M. Crawford, Jr., Flower Mound, TX (US); Mukesh Dalal, Flower Mound, TX (US); Joachim Paul Walser, Saarbruecken (DE)

(73) Assignee: i2 Technologies US, Inc., Dallas, TX (US)

( * ) Notice: Subject to any disclaimer, the term of this patent is extended or adjusted under 35 U.S.C. 154(b) by 0 days.

(21) Appl. No.: 09/325,937

(22) Filed: Jun. 4, 1999

Related U.S. Application Data

(60) Provisional application No. 60/088,147, filed on Jun. 4, 1998.

(51) Int. Cl.$^7$ ............................................. G06F 17/30
(52) U.S. Cl. ................................................ 707/1; 705/9
(58) Field of Search .......................... 707/1–3; 705/8–9; 700/95–97; 709/102–103

(56) References Cited

U.S. PATENT DOCUMENTS

| | | | |
|---|---|---|---|
| 5,408,663 A | * 4/1995 | Miller | 709/104 |
| 5,440,681 A | 8/1995 | Kudo | 395/161 |
| 5,467,268 A | * 11/1995 | Sisley et al. | 705/9 |
| 5,559,710 A | 9/1996 | Shanraray et al. | 364/468.06 |
| 5,574,640 A | 11/1996 | Sycara et al. | 364/401 |
| 5,737,728 A | 4/1998 | Sisley et al. | 705/8 |
| 5,768,594 A | * 6/1998 | Blelloch et al. | 717/6 |
| 5,787,000 A | 7/1998 | Lilly et al. | 364/468 |
| 5,887,174 A | * 3/1999 | Simons et al. | 717/9 |
| 5,943,652 A | * 8/1999 | Sisley et al. | 705/9 |
| 6,044,222 A | * 3/2000 | Simons et al. | 717/9 |
| 6,272,483 B1 | 8/2001 | Joslin et al. | 706/62 |

OTHER PUBLICATIONS

Lipske, Kenneth R., "A Greedy–based Decision Support System for Scheduling a Manufacturing Operation", Production & Inventory Management Journal v37n1 pp. 36–39 First Quarter 1996, ISSN: 0897–8336.*

Joslin, David E., "Squeaky Wheel" Optimization', Journal of Artificial Intelligence Research 10 (1999), pp. 353–373. Submitted Aug. 1998, published May 1999.*

Lipske, "Greedy–based decision support system for scheduling a manufacturing operation," Production and Inventory Management Journal, First Quarter 1996, APICS, vol. 37, No. 1 (Abstract).

(List continued on next page.)

Primary Examiner—James P. Trammell
Assistant Examiner—Mary Wang
(74) Attorney, Agent, or Firm—Baker Botts L.L.P.

(57) ABSTRACT

A method and system for solving constrained optimization problems. An initial abstract solution represents a prioritized set of decisions. The abstract solution is used as the basis for building a concrete solution. The concrete solution is analyzed to determine one or more local moves that represent a re-prioritization of the abstract solution. After a local moves is made, the process begins again with a new abstract solution, that is closer to an optimal solution. This process continues interactively until an optimal solution is reached or approached. The prioritized set of decisions can be implemented as a priority vector or a priority graph.

24 Claims, 1 Drawing Sheet

OTHER PUBLICATIONS

Fred Glover, Manuel Laguna, "Tabu Search", Modern Heuristic Techniques (Colin Reeves, Ed.) pp. 70–151.

E. Pinson, C. Prins, F. Rullier, "Using Tabu Search for Solving the Resource–Constrained Project Scheduling Program".

Dr. Lawrence Davis, Bolt Beranek and Newman, Inc., "Job Shop Scheduling with Genetic Algorithms", First Initial Conference Genetic Algorithms, CMV, Pittsburg 1985 Ed. Grefeuslette, John. pp. 136–140.

James M. Crawford, "An Approach to Resource Constrained Project Scheduling".

Egon Balas, "Machine Sequencing Via Disjunctive Graphs: An Implicit Enumeration Algorithm".

Tonius Baar, Peter Brucker, Sigrid Knust, "Tabu–Search Algorithms for the Resource–Constrained Project Scheduling Problem", Gsuabrueck Preprints, Reike P. Heft, 192.

David P. Clements, James M. Crawford, David E. Joslin, George L. Nemhauser, Markus E. Puttlitz, Martin W. P. Savelsbergh, "Heuristic Optimization: A hybrid AI/OR approach", Sep. 29, 1997.

Gilbert Syswerda, "Schedule Optimization Using Genetic Algorithms".

* cited by examiner

COMPUTER IMPLEMENTED SCHEDULING SYSTEM AND PROCESS USING ABSTRACT LOCAL SEARCH TECHNIQUE

RELATED PATENT APPLICATION

This application claims the benefit of U.S. Provisional Application No. 60/088,147, filed Jun. 4, 1998 and entitled "Computer Implemented Scheduling System and Process Using Abstract Local Search Technique".

TECHNICAL FIELD OF THE INVENTION

This invention relates in general to the fields of supply chain management, and single-enterprise and multi-enterprise planning and scheduling. More particularly, the present invention relates to a computer implemented scheduling system and process that uses an abstract local search technique.

BACKGROUND OF THE INVENTION

Computer implemented planning and scheduling systems are widely used for factory, enterprise and supply chain planning functions. In general, such systems can model the manufacturing or other environment and provide plans or schedules for producing items to fulfill consumer demand within the constraints of the environment.

The problem of planning or scheduling an environment can be represented as a constrained optimization problem. For example, consider a simple problem of sequencing a set of tasks on a resource in a manufacturing environment. In addition, assume that each task has a deadline, and the objective is to schedule each task so that it ends by the associated deadline. One way to view this problem, for example, is as a search in the space of start times. Under this view, the problem becomes a simple constrained optimization problem in which the variables are the start times, the constraint is that no tasks can overlap, and the objective is to minimize lateness. This type of approach to planning and scheduling problems can provide an efficient framework for producing plans.

An abstract local search (ALS) is an efficient approach for analyzing and resolving planning and scheduling a manufacturing or other environment. An ALS solves combinatorial optimization problems by making local moves in the space of abstract solutions. An abstract solution (for example, a task ordering) is mapped to a concrete solution (for example, a schedule) by a greedy solution builder that, generally, enforces all hard constraints. The concrete solution is then evaluated to determine flaws, usually by measuring soft constraint violations. The flaws in the concrete solution are used to generate modifications (moves) in the abstract solution, that might reduce the flaws in the concrete solution.

In non-analogous contexts, detecting flaws in concrete solutions and using them to drive modifications in abstract solutions has been shown to be effective in several local search applications (for example, GSAT for propositional satisfiability problems. Selman, Kautz, and Cohen, "Local Search Strategies for Satisfiability Testing", 1993, Vol. 26, *DIMACS Series in Discrete Mathematics and Theoretical Computer Science* (American Mathematical Society). One article attributes the effectiveness of iterative repair to making use of important information about the current solution to guide the search. Minton, Johnston, Philips, and Laird, "Solving large-scale constraint satisfaction and scheduling problems using a heuristic repair method", *Artificial Intelligence* 58:161–205 (1990).

SUMMARY OF THE INVENTION

In accordance with the present invention, a computer implemented scheduling system and process are disclosed that use an abstract local search technique.

A technical advantage of the present invention is that the abstract local search technique is useful for solving constrained optimization problems. It is particularly suited to a problem domain where some fast deterministic algorithm can map a set of priorities into a solution that satisfies the hard constraints in the problem.

Although some forms of priorities have previously been used for representing schedules, no general framework to integrate priorities into local search has been proposed. It is presented herein that the basic loop of priorities feeding into a greedy solution builder and an analysis technique that updates the priorities will be applicable to a large class of constrained optimization problems, and will scale to problems of realistic size and complexity.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1:
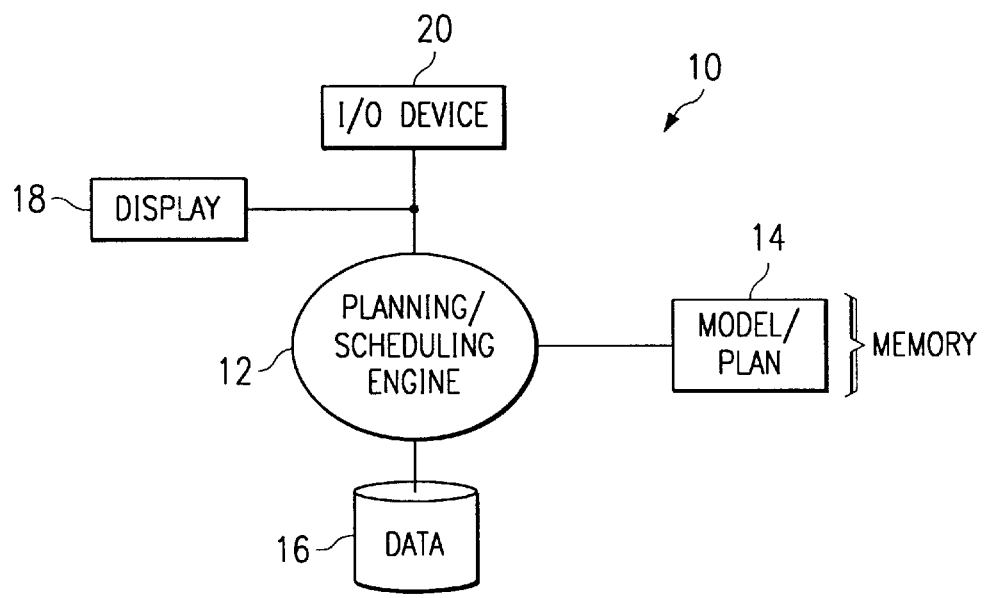
FIG. 1 is a block diagram of one embodiment of a computer implemented scheduling system that uses an abstract local search technique.

FIG. 1 is a block diagram of one embodiment of a computer implemented planning/scheduling system, indicated generally at 10. System 10 can be implemented on a computer system having typical computer components such as a processor, memory, storage devices, etc. In the embodiment of FIG. 1, system 10 executes software that implements a planning/scheduling engine 12 in processor memory. Planning/scheduling engine 12 can maintain and access a model/plan 14 of a manufacturing environment, supply chain or other environment which planning/scheduling engine 12 is used to plan or schedule. Planning/scheduling engine 12 also has access to data 16 stored in a fixed storage device. Data 16 can be used to initiate planning/scheduling engine 12 and model/plan 14. However, during operation, planning/scheduling engine 12 and model/plan 14 are typically maintained in processor memory for speed and efficiency. Planning/scheduling engine 12 can provide information to a user via display 18 and can receive input data from input devices 20.

In operation, system 10 can be used to plan or schedule an operating environment. For example, system 10 can address a simple problem of sequencing a set of tasks on a resource in a manufacturing environment. In this example, each task can have an associated deadline, and the objective is to schedule each task so that it ends by the associated deadline. A conventional way to approach this problem would be as simple constrained optimization problem in which the variables are the start times.

An improved way to view such a problem is to abstract away the start times and consider just the ordering of the tasks on the resource. Given any total ordering on the tasks, an optimal schedule consistent with the ordering can be obtained in linear time by scheduling each task, in order, as early as possible. Since each globally optimal schedule can be created from its task ordering, the sequencing problem can then be solved by searching in the space of task orderings. This space is much smaller than the space of start times, since a large number of obviously sub-optimal schedules, exactly those with some gaps between some adjacent tasks, are not even represented.

This change of representation brings the underlying search and optimization problem more clearly into focus. There is one resource and all tasks are competing for it. The task ordering is essentially a prioritization of the tasks. Tasks then draw from the resource in the priority order to generate a schedule.

A general principle here is that an algorithm for solving combinatorial optimization problems can be decoupled into two parts: (1) a priority generation algorithm and (2) a greedy solution builder. For most combinatorial optimization algorithms, one can write greedy algorithms that do a reasonable job much of the time. However, they usually fail because they are too greedy: e.g. they allow an early task to take a resource that turns out to be critical to a later task. Intuitively, if the priority order were just right, a greedy solver would generate an optimal solution. An essential idea behind abstract local search is that iterations can be done between using priorities as the input to a greedy solution builder, and using the proposed solution to intelligently update the priorities.

There is another, less obvious, advantage to the move to priority space: it is more suitable to a local search than the space of start times. For example, a small change in the start time of a task can generate multiple hard constraint violations (that is, overlaps) that the local search then needs to somehow weigh against soft constraint violations (that is, lateness). Since hard constraints are often automatically enforced in the optimal schedules corresponding to the task orderings, they can be simply evaluated by considering only the soft constraint violations.

Figure 2:
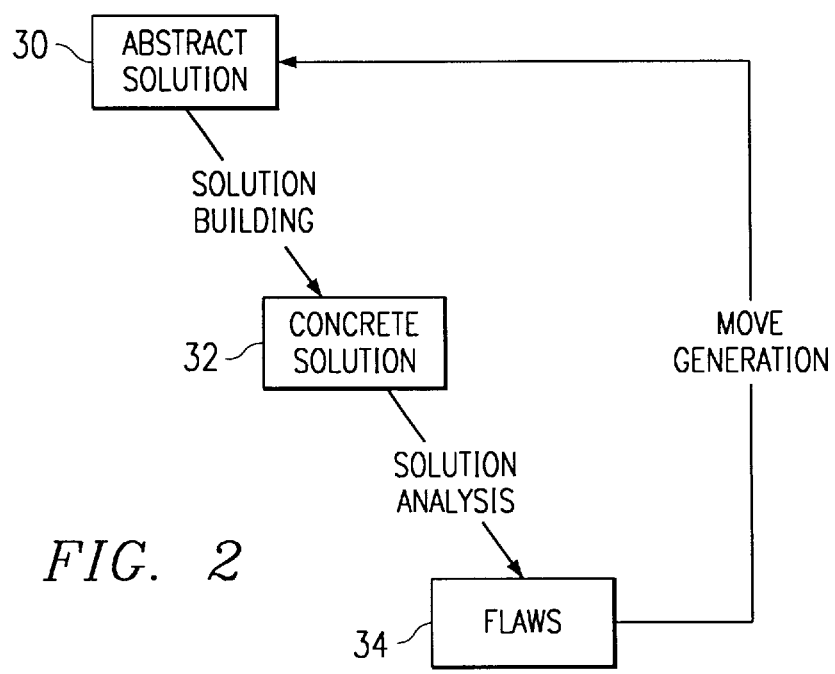
FIG. 2 is a block diagram of one embodiment of an abstract local search architecture for combinatorial optimization by a planning/scheduling engine.

FIG. 2 is a block diagram of one embodiment of an abstract local search architecture for combinatorial optimization. As shown, abstract solutions 30 can be processed through solution building to generate concrete solutions 32. Concrete solutions 32 can, in turn, be processed through solution analysis to identify flaws 34. A move generation process can then be used to modify the abstract solutions 30. Thus, in this architecture, flaws 34 are detected in concrete solutions 32 but modifications are made in abstract solutions 30.

The present abstract local search (ALS) operates by using concrete solutions to make information apparent about concrete flaws to guide moves in the abstract space. Modifications in abstract solutions can be motivated by (i) the smaller size of the abstract search space, and (ii) its greater suitability for local search when the concrete solutions share an intricate structure that is difficult to maintain by local moves in concrete space.

There can be several conditions for abstract local search to work well. One condition is a tractable builder. There should be a fast algorithm that maps any abstract solution to a feasible concrete solution (that is, a concrete solution with no hard constraint violations). Another condition is optimality-preserving abstraction. This means that, for any concrete solution S there is some abstract solution that maps to a concrete solution that is at least as good as S. Without this property, it is likely that abstract local search will not reach optimality. An additional condition is a tractable analysis. There should be a fast algorithm that identifies flaws in the concrete solution and that maps them to possible modifications in the abstract solution. Reasons for these conditions should be clear. However, it is possible they may be relaxed in practical applications.

Combinatorial Optimization

Combinatorial optimization problems generally consist of a set of decisions that must be made subject to a collection of constraints, and a goal function that evaluates candidate solutions for their "quality." For example, there may be a set of tasks whose start times are unknown (the decisions to be made) but which must satisfy the constraint that certain tasks must precede others (e.g. you have to sand the table before you paint it). The goal function might be to minimize the total cost of the proposed schedule.

Goal functions are sometimes expressed as soft constraints, that is, constraints that do not necessarily need to be enforced, but if they are violated then some penalty is incurred. In this kind of encoding, the optimization criterion is generally to minimize the sum of the penalties.

Many important combinatorial optimization problems are NP-hard. Intuitively, this is because all known methods for guaranteeing optimality are asymptotically equivalent in the worst case to an exhaustive enumeration of the space of all possible sets of decisions.

Local Search

Local search may be used to solve many difficult combinatorial optimization problems, including satisfiability, planning, and scheduling. In general, the essential idea is to start with some initial state and interactively modify the current state by making a promising local move, until a final solution is obtained. A local move makes only a small change in the current state, for example, by flipping the truth-value of a single variable, or by offloading a task from one resource to another. An internal evaluation criterion based on feasibility and the external optimization criterion can be used to determine the best among several possible moves. An analysis of some important flaw, that is, sub-optimality or infeasibility, in the current state is used to generate moves that might rectify the flaw. Some diversification technique, for example, heating in simulated annealing, is generally used to avoid getting trapped in local optima, for example, by allowing low probability moves that lead to less optimal states. Finally, most local search implementations restart several times to further reduce the effect of local optima.

Scheduling

In general, a scheduling problem can consist of a set of tasks 1, . . . , n to be scheduled subject to a collection of constraints. A solution is typically a schedule giving the start time for each task.

Each task can be associated with a processing time indicating the duration of the task. The constraints can usually be sequencing restrictions, resource capacity, constraints, and ready times and deadlines. A sequencing restriction, for example, might state that task i must complete before j can begin. A resource capacity constraint could state that tasks i and j conflict (usually because both require the same resource) and thus cannot be scheduled in parallel. A ready time might state the earliest time at which task i can start. A deadline can be the time by which task i should be completed.

Depending on the application, resource capacities, ready time, and deadlines, can each be either hard or soft constraints. However, typically, and in the embodiment discussed herein, capacities and ready times are hard constraints, and the deadline is a soft constraint.

Abstract Local Search for Scheduling

Scheduling can be, in a sense, a generalization of the simple sequencing problem discussed above. Tasks need to be assigned start times subject to capacity and ordering constraints. Because the typical objective is to minimize lateness, the natural thing to do is to order the tasks, and schedule each task, in order, as early as possible, subject to the hard constraints. Two embodiments of abstract local search (ALS) techniques are discussed below; each is a variant on this basic idea.

While discussing ALS for scheduling problems, certain terms are often used—like abstract schedule, concrete schedule, and schedule builder—where "schedule" replaces the more general "solution." Further, "concrete" may often be omitted from concrete schedule.

ALS Using Priority Vectors

One embodiment of the invention is to implement an ALS technique using priority vectors. A priority vector p maps each task i to an integer p(i) that represents the global "importance" of the task. Any such priority vector can be mapped to a schedule using the simple schedule builder SB(PV) given in the following TABLE 1. In this example, a task is considered enabled if and only if all of its predecessors have been scheduled.

The following table shows one embodiment of SB(PV): a priority-vector based schedule builder.

TABLE 1 while some task remains unscheduled do
    t = highest priority enabled but unscheduled task;
    schedule t as early as possible subject to hard constraints;
end The priority-vector approach to scheduling can satisfy all the conditions discussed above. The schedule builder SB(PV) is clearly tractable, since it builds a feasible schedule in $O(n^2)$ time, where n in the number of tasks (it is conjectured that the expected run time of SB(PV) would be more like $O(n \log(n))$ but a formal proof is not provided herein).

The following theorem shows that the priority vector abstraction is an optimization preserving abstraction.

Theorem 1: For any scheduling problem, and any schedule s, there is some priority vector such that SB(PV) produces a schedule with total lateness less than or equal to that of s.

Analysis of a schedule can be done in a variety of ways. An example is a technique referred to as general critical path analysis. If a task is late then its priority is increased by an amount b that is calculated based on how late the task is. Whenever the priority on a task is increased, if that task could not be scheduled any earlier because of a precedence relationship, then the priority of that predecessor is increased by b. If the task could not be scheduled earlier because of a resource contention, then the priority of all tasks is increased using that resource at that time by b/2. Both of these rules are applied recursively (until the priority increment becomes negligible). The analysis can call the function assignBlame (t, b), shown in TABLE 2, for each task t that is late by b days.

TABLE 2 proc assignBlame (task t, int b);
    increase priority of t by b units;
    if t was late because of a precedence relation with task $t_2$ then assignBlame($t_2$, b);
    else // t was late because of a resource contention
        foreach task $t_2$ using the same resource as t:
            assignBlame($t_2$, b/2);
    end
end A schedule-build-analyze cycle is shown in TABLE 3, below. This is basically a vanilla iterative improvement local search enriched by an intensification strategy. Note that blame is assigned for all due-date violations. The thinking behind this is that running the schedule builder on large problems is relatively expensive—at least compared to flips in SAT problems—and it is desired to leverage the analysis as much as possible. An interesting variant of this (and more in the spirit of GSAT) would be to assign blame for just one due-date violation at a time and then rebuild the schedule. A steepest-descent variant (perhaps computationally too expensive for very large problems) would be to consider several ways to resolve each due-date violation, and evaluate each.

TABLE 3 for i = 1 to max-restarts do
    initialize priorities;
    for i = 1 to max-iterations do
        build schedule for current set of priorities;
        if this gives a new best schedule then save it;
        with prob. p return to best schedule ever seen;
        foreach late task t: assignBlame (t, days late)

A good initial assignment of priorities is helpful for solving large scheduling problems. If the process starts from a reasonably good initial priority vector, the most can be made of relatively limited computational resources. In the examples looked at to date, each task can be uniquely associated with a "delivery" task that has a deadline (e.g. there are no situations in which t1 has deadline d1 and must precede t2 that has deadline d2. We also never have t1 preceding t2 and t3 each of which has a deadline.) Thus, the initial priority of each task can be taken to be the arithmetic inverse of the due date of the corresponding delivery task (i.e. tasks with early deadlines are given the highest priorities).

ALS Using Priority Graphs

Another embodiment is to implement an ALS technique using priority graphs. A priority graph is a directed acyclic graph whose nodes represent tasks and arcs represent priorities: an arc from A to B indicates that task A has higher priority than task B, that is, the schedule builder should schedule task A before scheduling task B (unless sequencing restrictions require that task B must complete before task A).

Priority graphs represent a somewhat different kind of information than priority vectors. While the numbers in vectors can encode relative strengths in priorities, the information in graphs is purely relational, e.g. task A has higher priority than task B. (Although it is possible to extend this by labeling the arcs by numbers indicating their relative strengths.) Another difference is that while vectors force a decision on relative priorities between all pairs of tasks, graphs do not have to commit to these extraneous priorities that are not motivated by the analysis. Thus, ALS using priority graphs can have the flexibility of allowing more decisions to be made by the schedule builder. This could lead to more effective use of sophisticated schedule builders that would otherwise be unnecessarily constrained by priority vectors.

Priority graphs are similar to disjunctive graphs. However, Changes in the priority graph are interlaced with domain-specific greedy scheduling.

In greedy scheduling, the schedule builder starts with an empty schedule and keeps scheduling tasks one at a time until the schedule is complete. The next task to be scheduled is selected from the enabled tasks, using a customizable task dispatching criterion that uses a prioritized sequence of heuristics to filter all available tasks. The selected task can be scheduled using a customizable task scheduling criterion that uses a prioritized sequence of constraints to guarantee that hard constraints are satisfied.

A variety of dispatching criteria may be used. One example is an EST/EFF combination of criteria for task dispatching: (i) select the task that can start the earliest, and (ii) among those, select the task that can finish the earliest. Further, in this case, the following task scheduling criterion can be implemented: schedule the selected task on the first least-constrained resource among those that can start at the earliest possible time, without violating any capacity constraints. This provides an efficient $O(n^2)$ time schedule builder.

In schedule analysis, the schedule analyzer selects the most late task for flaw analysis. It determines all possible direct causes for the delay, and suggests changes in the priority graph to offset those causes. It constructs a lateness DAG (directed acyclic graph) whose nodes consist of the late task as well as all other tasks that could have contributed to the lateness. The ALS technique can randomly select a set of moves and evaluate each move by constructing new abstract and concrete schedules. The most promising pair of schedules can be used to start the next iteration of local search. Meta-heuristic techniques such as tabu memory can be used in a straightforward manner to improve the search.

Experimental Results

The following are brief experimental results on a class of scheduling problems which arise in the domain of supply chain planning. The problem under consideration is an extension of a Resource Constrained Project Scheduling (RCPS) problem described in Slowinski, R., and Weglarz, J., eds. 1989. *Advances in Project Scheduling*. Elsevier Science.

In general, the problem is parameterized as follows. Given are n tasks and r renewable resources. Resource k has constant capacity $R_k$. Task $t_i$ has a duration of $p_i$ during which $r_{ik}$ units of resource k are occupied (no preemption is allowed). Additionally, sequencing restrictions (precedences) between tasks must be obeyed. The main extension with respect to the standard RCPS class are ready-times and due-dates for tasks. As a consequence, the objective is to minimize a measure of the overall lateness rather than makespan (the length of time from the start of the first task to the completion of the last task). The goal is to assign each task a start time $s_i$ such that all precedence and capacity constraints are met and the total lateness is minimized.

Problem instances of this extended RCPS class are typically much larger than classical scheduling instances (tens of thousands of tasks instead of on the order of one hundred tasks reported in the RCPS literature). This is a challenge as algorithms for scheduling (e.g. job shop scheduling) often fail to scale up to this problem size.

The ALS technique described herein was tested with a real-world problem in semiconductor manufacturing. This problem involved over 30,000 tasks to be scheduled on more than 20 resources. Experimental results are given in Table 4. Reported runtimes are of greedy scheduling SB(PV), and ALS. The table reports the number of iterations and restarts, total lateness (in days), and runtimes in seconds CPU time. The runtimes were averaged over 50 runs for $ALS^1$ and 2 runs for $ALS^2$.

TABLE 4

| Algorithm | Iterations | Restarts | Lateness | Runtime |
|---|---|---|---|---|
| SB (PV) | NA | NA | 3930 d | 6 s |
| $ALS^1$ | 200 | 0 | 3663 d | 93 s |
| $ALS^2$ | 200 | 50 | 3600 d | 4600 s |

SB(PV) is the result of running just the scheduler builder with the initial heuristics SB(PV) of TABLE 1. 'ALS' is the version of ALS with priority vectors. There are two key tuning parameters for this version of ALS: the number of restarts, and the probability that moves are accepted that do not improve the quality of the schedule. The number of iterations and the number of restarts were varied as shown in the table. An intensification strategy was performed by flipping a coin after each move and returning to the best state ever seen with probability ½. Additional experiments have been performed with different restart frequencies, and different noise levels, but the results were not found to be qualitatively different.

ALS Technique

As discussed above, an ALS technique can work best in problem domains having at least these three conditions (or attributes): a tractable solutions builder, optimality-preserving abstractions, and tractable analysis routines.

With respect to a tractable builder, if the solution builder fails in some rare cases to generate a feasible solution, then this is not necessarily fatal. One can give such priority vectors a very low "score" causing the search to avoid them. Whether this low scoring is workable in practice depends on how common such priority vectors are.

With respect to optimality-preserving abstraction, for large problems it can be safely assumed that optimal solutions will not be generated. Thus abstractions that are "nearly" optimality preserving may be sufficient. The utility of such abstractions can be assessed by comparison of ALS against other techniques.

With respect to tractable analysis, if there is no way to map from soft-constraint violations in the concrete solution to suggested changes in the abstract solution, then local search essentially performs a weighted random walk. This may be acceptable, however, since undirected local search has been used successfully in various domains.

The present ALS technique provides significant advantages. The solution builder itself can encode a reasonable amount of domain knowledge, allowing the higher-level control (that is, the local search) to be domain-independent. The space of priority vectors offers a generic way to form local search in complex domains. If there is an intricate solution structure that is easy to obtain constructively, but difficult to maintain by local repairs, priority space appears to be more suitable to local search than the space of concrete solutions. Optimal priorities cannot, in general, be determined a priori (if they can, and the abstraction is optimality preserving, then the optimization problem is tractable).

However, they can often be improved by an analysis of concrete solutions. The general critical path analysis algorithm is an example of such an analysis. The solution builder can be efficient (at least in the domain of scheduling). Further, small changes to the priority vector can translate into large changes in the concrete solution. Together these facts allow ALS to be used productively on large problems.

The experimental results demonstrate that ALS techniques can perform meaningful optimization, compared to simple heuristic techniques, on large scheduling problems of high complexity. The utility of this approach is not limited to scheduling. There are potential application domains for abstract local search, for example, in distribution planning, vehicle routing, or multi-level scheduling problems.

Other Embodiments

Although the present invention has been described in detail, it should be understood that various changes, substitutions and alterations can be made hereto without departing from the spirit and scope of the invention.

What is claimed is:

1. A local search method of solving an optimization problem having a set of decisions to be made subject to a set of constraints, comprising the steps of:
   defining an initial abstract solution, representing a prioritized set of decisions;
   building a concrete solution in accordance with said prioritized decisions, subject to said constraints, the concrete solution including all decisions to be made in solving the optimization problem;
   analyzing said concrete solution to determine at least one flaw in said concrete solution;
   modifying said priorities in response to said analyzing step;
   generating at least one local move from said concrete solution, said move representing rectification of said flaw and re-prioritization of said decisions;
   re-defining said abstract solution by making said local move; and
   interactively repeating said building, analyzing, modifying, generating, and re-defining steps without adding any additional decisions.

2. The method of claim 1, wherein said prioritized set of decisions is implemented with a priority vector having a numerical priority value for each said decision, and wherein said re-prioritization is an update of said numerical values.

3. The method of claim 1, wherein said prioritized set of decisions is implemented with a priority graph representing priority relationships between said decisions, and wherein said re-prioritization is an update of said relationships.

4. The method of claim 1, wherein said constraints are hard constraints and soft constraints, wherein said building step is subject to hard constraints, and wherein said analyzing step is in terms of soft constraints.

5. The method of claim 1, wherein said building step is performed by a greedy solution builder.

6. A local search method of solving a scheduling problem having a set of tasks to be scheduled subject to a set of constraints, comprising the steps of:
   defining an initial abstract solution representing a prioritized ordering of said tasks;
   building a concrete solution in accordance with said prioritized ordering, subject to said constraints, said concrete solution representing a schedule of all tasks to be scheduled;
   analyzing said concrete solution to identify at least one flaw in said concrete solution;
   modifying said priorities in response to said analyzing step;
   generating at least one local move from said concrete solution, said move representing rectification of said flaw and re-prioritization of said tasks;
   re-defining said abstract solution by making said local move; and
   interactively repeating said building, analyzing, modifying, generating, and re-defining steps without adding any tasks to be scheduled.

7. The method of claim 6, wherein prioritized set of tasks is implemented with a priority vector having a numerical priority value for each said task, and wherein said re-prioritization is an update of said numerical values.

8. The method of claim 7, wherein said modifying step is performed by increasing priority of a task based on its lateness.

9. The method of claim 7, wherein said initial abstract solution represents an initial prioritized ordering of tasks obtained by associating each tasks with a deadline and assigning higher priorities to tasks with earlier deadlines.

10. The method of claim 6, wherein said prioritized set of tasks is implemented with a priority graph representing priority relationships between said tasks, and wherein said re-prioritization is an update of said relationships.

11. The method of claim 6, wherein said constraints are hard constraints and soft constraints, wherein said building step is subject to hard constraints, and wherein said analyzing step is in terms of soft constraints.

12. The method of claim 6, wherein said building step is performed by a greedy solution builder.

13. The method of claim 6, wherein said analyzing step is performed with critical path analysis techniques.

14. Software for solving an optimization problem having a set of decisions to be made subject to a set of constraints, the software embodied in a computer-readable medium and operable, when executed, to:
   define an initial abstract solution, representing a prioritized set of decisions;
   build a concrete solution in accordance with said prioritized decisions, subject to said constraints, the concrete solution including all decisions to be made in solving the optimization problem;
   analyze said concrete solution to determine at least one flaw in said concrete solution;
   modify said priorities in response to said analyzing step;
   generate at least one local move from said concrete solution, said move representing rectification of said flaw and re-prioritization of said decisions;
   re-define said abstract solution by making said local move; and
   interactively repeat said building, analyzing, modifying, generating, and re-defining steps without adding any additional decisions.

15. The software of claim 14, wherein said prioritized set of decisions is implemented with a priority vector having a numerical priority value for each said decision, and wherein said re-prioritization is an update of said numerical values.

16. The software of claim 14, wherein said prioritized set of decisions is implemented with a priority graph representing priority relationships between said decisions, and wherein said re-prioritization is an update of said relationships.

17. The software of claim 14, wherein said constraints are hard constraints and soft constraints, wherein said building, step is subject to hard constraints, and wherein said analyzing step is in terms of soft constraints.

18. Software for solving a scheduling problem having a set of tasks to be scheduled subject to a set of constraints, the software embodied in a computer-readable medium and operable, when executed, to:

define an initial abstract solution representing a prioritized ordering of said tasks;

build a concrete solution in accordance with said prioritized ordering, subject to said constraints, said concrete solution representing a schedule of all tasks to be scheduled;

analyze said concrete solution to identify at least one flaw in said concrete solution;

modify said priorities in response to said analyzing step;

generate at least one local move from said concrete solution, said move representing rectification of said flaw and re-prioritization of said tasks;

re-define said abstract solution by making said local move; and interactively repeat said building, analyzing, modifying, generating, and re-defining steps without adding any tasks to be scheduled.

19. The software of claim 18, wherein a prioritized set of tasks is implemented with a priority vector having a numerical priority value for each said task, and wherein said re-prioritization is an update of said numerical values.

20. The software of claim 19, wherein the software is operable to modify said priorities by increasing priority of a task based on its lateness.

21. The software of claim 19, wherein said initial abstract solution represents an initial prioritized ordering of tasks obtained by associating each task with a deadline and assigning higher priorities to tasks with earlier deadlines.

22. The software of claim 18, wherein said prioritized set of tasks is implemented with a priority graph representing priority relationships between said tasks, and wherein said re-prioritization is an update of said relationships.

23. The software of claim 18, wherein said constraints are hard constraints and soft constraints, wherein said building step is subject to hard constraints, and wherein said analyzing step is in terms of soft constraints.

24. The software of claim 18, the software is operable to analyze the concrete solution using critical path analysis techniques.

* * * * *